United States Patent
Quisling

[15] 3,635,766
[45] Jan. 18, 1972

[54] ELECTROCHEMICAL BATTERIES

[72] Inventor: Sverre Quisling, 1240 Sherman Ave., Madison, Wis. 53703

[22] Filed: June 25, 1969

[21] Appl. No.: 836,384

[52] U.S. Cl. .................................136/100, 136/6, 136/166
[51] Int. Cl. .......................................................H01m 17/00
[58] Field of Search .....................136/100, 13, 14, 6, 83, 69, 136/70, 133, 166, 143, 134

[56] References Cited

UNITED STATES PATENTS

| | | | |
|---|---|---|---|
| 1,419,396 | 6/1922 | Manwaring | 136/6 |
| 2,920,127 | 1/1960 | Vogt | 136/6 |
| 2,968,686 | 1/1961 | Duddy | 136/6 |
| 3,369,937 | 2/1968 | Himy | 136/80 |
| 3,377,201 | 4/1968 | Wagner et al. | 136/13 |
| 3,457,112 | 7/1969 | Reber | 136/6 |

*Primary Examiner*—Winston A. Douglas
*Assistant Examiner*—C. F. Lefevour
*Attorney*—John M. Winter

[57] ABSTRACT

A multicell battery having nonconductive, replaceable cell partitions having a closed configuration such as cylindrical and being coated both inside and outside with conductive material to provide an electrode in each of two adjacent cells. The cell partitions are set in a nonconductive yieldable sealing material forming the bottom of the cells and are united by a bridging element for withdrawal and replacement as a unit.

1 Claims, 3 Drawing Figures

PATENTED JAN 18 1972 3,635,766

INVENTOR.
SVERRE QUISLING

ELECTROCHEMICAL BATTERIES

FIELD OF THE INVENTION

This invention relates to electrochemical devices and electrode construction therefor.

In known primary-type electrochemical devices, such as conventional dry cells, all of energy that the cell will ever deliver is put in as chemical energy when the cell is made. When this energy is depleted the cell is dead. The fuel for a conventional dry cell is its metallic zinc container which acts as a negative electrode. When this cell delivers current, the zinc goes into solution to form zinc chloride and when the zinc has been consumed the cell must be discarded and replaced with a fresh one.

In known storage cells such, as the conventional lead-acid battery, the electrodes are made of lead and lead peroxide in a sulfuric-acid electrolyte. The active materials are most commonly in the form of pastes held in lead allow grids. Storage batteries, of course, employ completely reversible chemical reactions and are therefore rechargeable. However, the active materials tend to flake off the grids with repeated charging and discharging thereby eventually requiring an entire battery to be replaced.

SUMMARY OF THE INVENTION

Basically, my invention in multicell electrochemical devices comprises nonconductive, replaceable cell partitions formed in a closed configuration, such as cylindrical, and disposed substantially in series, such as concentrically. The cell partitions are coated on both their inside and outside surfaces with conductive material to provide an electrode in each of two adjacent cells separated by the partition.

The cell partitions are set in a nonconductive, yieldable, sealing material forming the bottom of said cells. The electrode-forming cell partitions are united by a bridging element which may be in the form of a removable cover for the battery to facilitate removal and replacement of the electrode forming cell partitions when the electrode material thereon has been substantially depleted. Accordingly, the electrodes can be readily replaced with an electrode refill unit rather than recharging the battery or replacing the worn out battery in its entirety.

DESCRIPTION OF THE PREFERRED EMBODIMENTS

Figures 1, 2, 3:
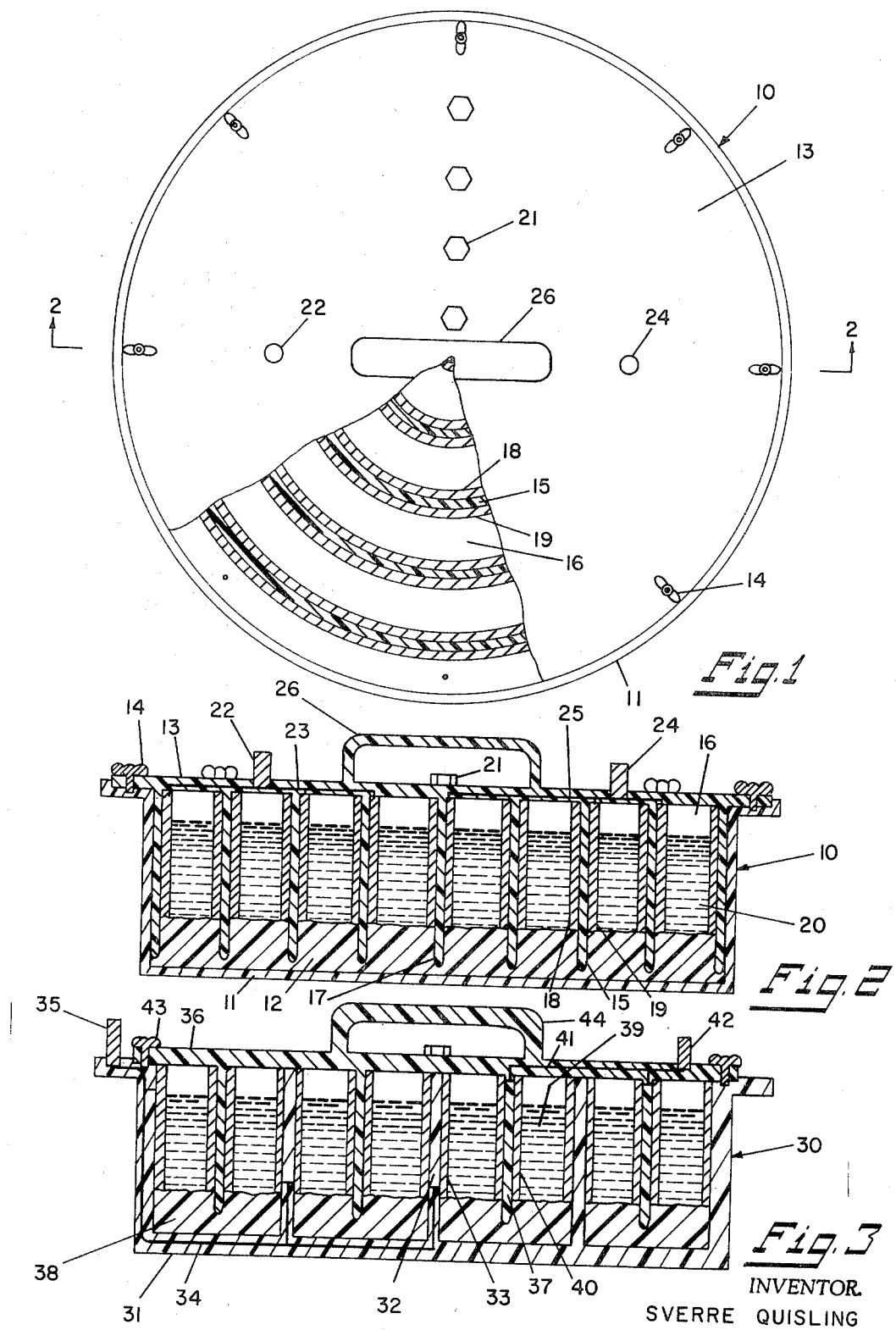
FIG. 1 is a plan view of a multicell electrochemical battery embodying my invention, with a portion of the cover thereof broken away to show the concentric cell formation therein.
FIG. 2 is a sectional view taken along line 2—2 in FIG. 1.
FIG. 3 is a sectional view of a second embodiment of my invention.

Referring now more specifically to the drawings wherein like numerals refer to like parts throughout the several views, FIGS. 1 and 2 show a first embodiment of a multicell electrochemical battery 10, embodying my invention.

The battery 10 has a nonconductive cylindrical container 11 made of plastic or other suitable nonconductive material. Sealing means 12 shown in the form of a nonconductive, yieldable, matrix material such as tar or the like is provided in the bottom of the container 11. A circular cover 13 of substantially rigid nonconductive material is removably secured on the container 11 by peripheral wingnuts 14.

The cover has a concentric series of nonporous, nonconductive, cylindrical partitions 15 depending therefrom and extending into the yieldable sealing material 12 to provide a series of concentrically spaced individual annular cells 16. While the cell partitions 15 are shown in a cylindrical configuration, it is understood that they may be of any other closed geometric configuration such as triangular, rectangular or polygonal. The central element 17 may be rod shaped as shown.

In the particular embodiment shown in FIGS. 1 and 2, the inwardly facing surface of each of the partitions 15 is coated with a conductive material such as lead peroxide to form an annular positive electrode 18 in each of the cells 16. The outwardly facing surface of each cylindrical partition 15 is coated with a conductive material having a different electrochemical value than the positive electrode material, such as lead, to form an annular negative electrode 19 in each cell.

An electrolyte 20 such as a sulphuric-acid solution is provided in each cell. The electrolyte in the cells may be replenished through caped inlets 21.

The conductive materials forming the electrodes 18 and 19 may be formed on the partitions 15 by dipping, brushing, spraying, pasting, laminating, blowing, or any other coating method suitable for the particular materials involved.

Each of the positive electrodes 18 is connected to a positive terminal 22 by an electrical conductor 23 and each of the negative electrodes 19 is similarly connected to a negative terminal 23 by an electrical conductor 25. The conductors 23 and 25 are preferably imbedded in the nonconductive cover 13 as shown in FIG. 2.

The cover 13 provides a bridging unit connecting the electrode forming partitions 15. When the battery has lost its charge or when the electrodes have deteriorated to a point such that the battery cannot be recharged, the electrodes may be removed as a unit by releasing wingnuts 14 and lifting the cover off with handle 26. A new or recoated electrode refill unit may then be inserted whereby the coated partitions 15 engage the sealing material 12 to form the individual sealed annular cells.

The second embodiment of my invention shown at 30 in FIG. 3 is particularly well suited for a primary-type cell in which only the negative electrode material is consumed during operation. Unlike the common dry cell where the entire battery must be replaced, in this embodiment of my invention the depleted negative electrode can be readily replaced as a unit.

In this form of my invention, the battery 30 has a nonconductive cylindrical container 31. The container has upstanding, cylindrical, concentrically disposed, cell partitions 32 formed integral with the bottom of the container. Both sides of these upstanding partitions 32 are coated with a conductive material such as copper or the like to form a positive electrode 33.

As in the first embodiment, while these partitions 32 are shown in a cylindrical configuration, they can take any geometrically closed shape so as to form individual cells.

The positive electrodes 33 are connected by an electrical conductor 34 imbedded in the container material to a positive terminal 35 mounted on the edge of the container.

The nonconductive cover 36 in this embodiment has a series of depending cylindrical cell partitions 37 that are alternately interspaced between the anode-forming partitions 32 and extend into the yieldable sealing material 38 to provide a series of concentrically spaced individual annular cells 39. Both sides of partitions 37 are coated with a conductive material such as zinc to form an annular negative electrode 40 in each of the cells 39. The negative electrode 14 are connected by an electrical conductor 41 to a negative terminal 42 in the cover.

Accordingly, when the negative electrode material has been consumed by reaction with the electrolyte, the battery may be immediately rejuvenated by merely releasing the wingnuts 43 and lifting handle 44 to remove the cover which forms a bridging unit for the negative electrode forming partitions 37 and replacing same with a new or recoated refill unit.

The examples of materials given herein for various elements are merely illustrative and it is understood that the invention does not reside in the particular materials used and that any suitable materials may be employed without departing from the concept of the invention.

I claim:

1. In an electrochemical battery, the improvement comprising:

a. a nonconductive container, b. a nonconductive yieldable sealing means in the bottom of said container, c. a plurality of replaceable nonconductive partitions releasably set in said nonconductive yieldable sealing means to form a plurality of individual closed cells in said container, said partitions being coated with conductive electrode material, and d. a nonconductive cover removably secured on said container, said electrode coated partitions being attached to and extending downwardly from said cover to facilitate removal and replacement of said plurality of said coated partitions as a unit.

* * * * *